United States Patent [19]

Campbell et al.

[11] Patent Number: 4,868,966
[45] Date of Patent: Sep. 26, 1989

[54] HAND TOOL HAVING MULTIPLE END PIECES FOR ASSEMBLING DISASSEMBLING CONSTANT VELOCITY JOINTS

[75] Inventors: Edward N. Campbell, Oklahoma City; Garald D. Worley, Del City, both of Okla.

[73] Assignee: Dana Corporation, Toledo, Ohio

[21] Appl. No.: 162,311

[22] Filed: Jun. 19, 1987

Related U.S. Application Data

[63] Continuation of Ser. No. 833,337, Feb. 25, 1986, abandoned.

[51] Int. Cl.$^4$ .............................................. B25B 27/14
[52] U.S. Cl. ........................................................ 29/270
[58] Field of Search ....................... 29/270, 278; 43/23; 81/177.85

[56] References Cited

U.S. PATENT DOCUMENTS

| | | | |
|---|---|---|---|
| 1,433,114 | 10/1922 | Bellows | 81/177.85 X |
| 1,676,370 | 7/1928 | Victory | 81/177.85 X |
| 2,612,799 | 7/1954 | Gilbert . | |
| 3,025,590 | 2/1962 | Litz . | |
| 3,168,774 | 5/1928 | Volkening . | |
| 3,222,096 | 12/1965 | Kaman | 81/177.85 X |
| 3,402,450 | 10/1969 | Sutowski . | |
| 3,750,500 | 9/1969 | Peterson . | |
| 3,896,654 | 5/1976 | Mancini . | |
| 4,050,136 | 3/1980 | Shultz . | |
| 4,096,896 | 6/1980 | Engel | 81/177.85 X |
| 4,255,842 | 12/1981 | McCaulou . | |
| 4,261,128 | 4/1981 | Dobbins | 43/23 X |
| 4,339,865 | 1/1981 | Shultz . | |
| 4,369,558 | 8/1981 | Iwata et al. . | |

FOREIGN PATENT DOCUMENTS

1003214  1/1977  Canada .................................. 43/23

OTHER PUBLICATIONS

Production Tool Illustation Drawing No. T-17808, Dana Corporation.

Primary Examiner—Robert C. Watson
Attorney, Agent, or Firm—MacMillan, Sobanski & Todd

[57] ABSTRACT

A hand tool for assembling and disassembling constant velocity joints of varing size is disclosed. The hand tool includes a handle portion connected to one end of a generally C-shpaed body portion. The other end of the C-shaped body portion includes a projection extending outwardly in general longitudinal alignment with the handle portion. The projection is adapted to receive one of a plurality of differently sized end pieces thereon. Each of the end pieces is formed generally in the shape of a hollow cylinder having one closed end. The inner diameters of all of the end pieces are equal to each other, and all are slightly larger than the outer diameter of the projection. The outer diameters of the end pieces are all different, corresponding to a constant velocity joint having a different size. An O-ring is provided for selectively retaining one of the end pieces on the projection for use with a given size of constant velocity joint. Additonally, an enlarged hook portion is formed on the C-shaped body portion. In one embodiment of the invention, the hook portion is formed integrally with the C-shpaed body portion. In another embodiment, the hook portion is formed by a hook pin which is slidably disposed in a recess formed in the C-shaped body portion. A pin is provided for selectively retaining the hook pin in one of a plurality of extended positions so that the extended length thereof may be varied in accordance with the size of the particular constant velocity joint. The hand tool is adapted to be inserted within a constant velocity joint to move the joint to a position where it can be disassembled and re-assembled.

7 Claims, 2 Drawing Sheets

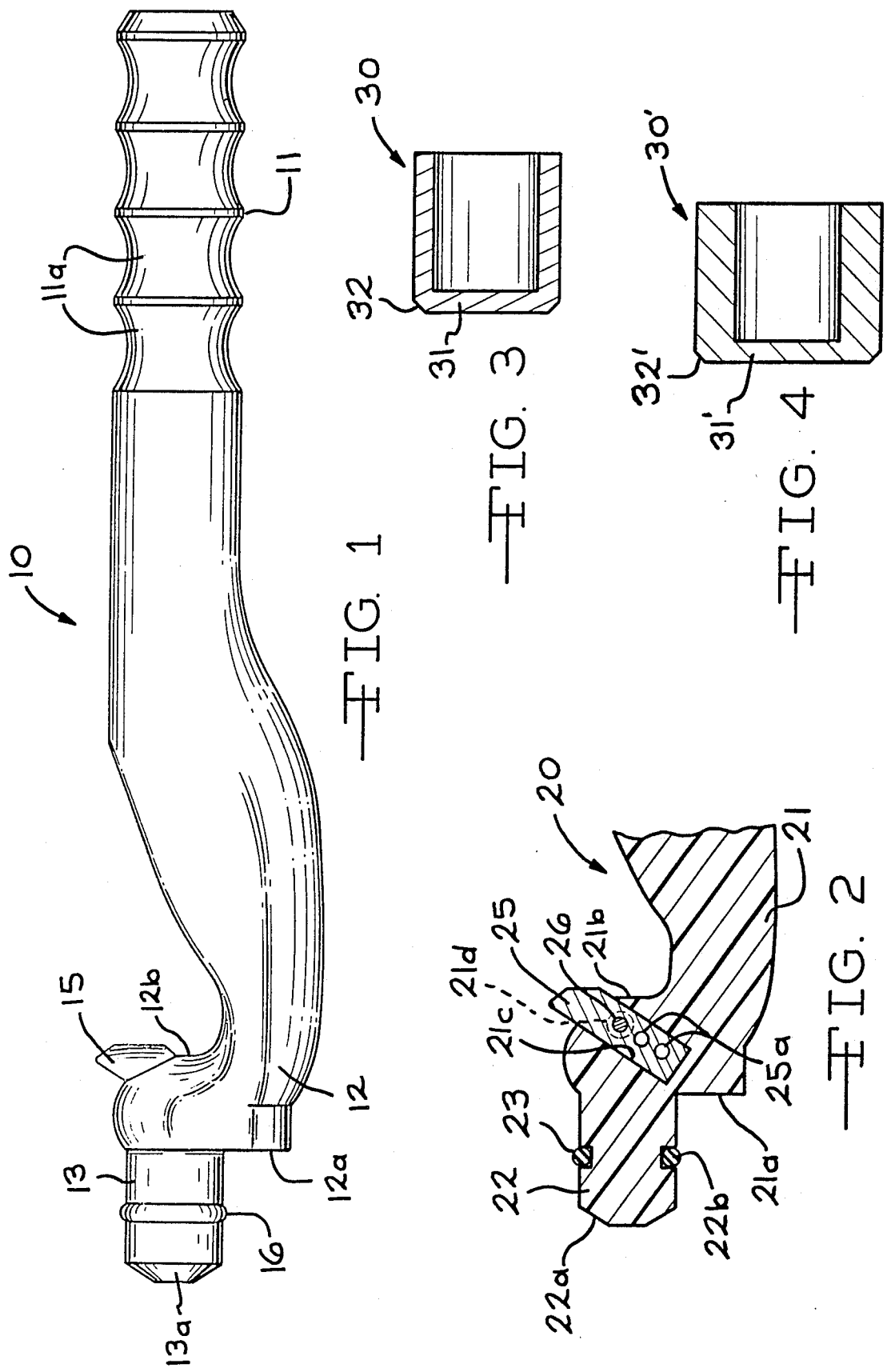

HAND TOOL HAVING MULTIPLE END PIECES FOR ASSEMBLING DISASSEMBLING CONSTANT VELOCITY JOINTS

This application is a continuation of application Ser. No. 06,833,337 filed 2/25/86, now abandoned.

BACKGROUND OF THE INVENTION

The present invention relates in general to hand tools and in particular to a hand tool having multiple end pieces for assembling and disassembling constant velocity joints of varying size.

Constant velocity joints are well known in the art and are adapted to transmit uniform rotary motion from one shaft to another, while permitting the shafts to be disposed at varying angles. Such rotary motion is transmitted through a plurality of hardened steel balls rolling in grooved raceways formed in respective races connected to each shaft. The geometry of the ball grooves maintains the driving balls, and a retaining cage therefor, in a half-angle position between the shafts at all times. In other words, the grooved construction of the joint compels the balls and the retaining cage to lie in a plane which bisects the angle between the driving shaft and the driven shaft, regardless of what the angle therebetween is. By maintaining the balls in the bisecting plane at all times, constant velocity motion between the two shafts is achieved.

As with most mechanical structures, constant velocity joints require periodic servicing because of wear. To accomplish such servicing, the components of the joint must be moved to a position wherein the balls therein can be removed. Once all of the balls are removed, the other components of the constant velocity joint can be disassembled, inspected, and replaced if necessary. Hand tools are currently available which assist in such disassembly of constant velocity joints and in the subsequent re-assembly thereof. However, since constant velocity joints are manufactured in many different sizes, it is necessary to provide an individual hand tool for each different size of constant velocity joint. Accordingly, it would be desirable to provide a single hand tool which is adaptable for use in assembling and disassembling constant velocity joints of varying size.

SUMMARY OF THE INVENTION

The present invention relates to an improved hand tool for assembling and disassembling constant velocity joints of varying size. The hand tool includes a handle portion connected to one end of a generally C-shaped body portion. The other end of the C-shaped body portion includes a projection extending outwardly in general longitudinal alignment with the handle portion. The projection is adapted to receive one of a plurality of differently sized end pieces thereon. Each of the end pieces is formed generally in the shape of a hollow cylinder having one closed end. The inner diameters of all of the end pieces are equal to each other, and all are slightly larger than the outer diameter of the projection. The outer diameters of the end pieces are all different, each corresponding to a constant velocity joint having a different size than the others. Means are provided for selectively retaining one of the end pieces on the projection for use with a given size of constant velocity joint. Additionally, an enlarged hook portion is formed on the C-shaped body portion. In one embodiment of the invention, the hook portion is formed integrally with the C-shaped body portion. In another embodiment, the hook portion is formed by a hook pin which is slidably disposed in a recess formed in the C-shaped body portion. Means are provided for selectively retaining the hook pin in one of a plurality of extended positions so that the extended length thereof may be varied in accordance with the size of the particular constant velocity joint. The hand tool is adapted to be inserted within a constant velocity joint to move the joint to a position where it can be disassembled and re-assembled.

It is an object of the present invention to provide an improved hand tool for assembling and disassembling constant velocity joints of varying size.

It is another object of the present invention to provide such an improved hand tool which includes a plurality of end pieces adapted to be selectively retained thereon for use.

It is a further object of the present invention to provide such a hand tool with a hook portion having a variable extended length.

It is yet another object of the present invention to provide such a hand tool which is simple and inexpensive in construction and operation.

Other objects and advantages of the present invention will become apparent to those skilled in the art from the following detailed description of the preferred embodiments, when read in light of the accompanying drawings.

BRIEF DESCRIPTION OF THE DRAWINGS

FIG. 1 is a side elevational view of an improved hand tool in accordance with the present invention.

FIG. 2 is a fragmentary sectional elevational view of an alternate embodiment of the hand tool of FIG. 1.

FIG. 3 is a sectional elevational view of a first end piece adapted for use with either of the hand tools of FIGS. 1 and 2.

FIG. 4 is a sectional elevational view of a second end piece adapted for use with either of the hand tools of FIGS. 1 and 2.

DETAILED DESCRIPTION OF THE PREFERRED EMBODIMENTS

Figure 5:
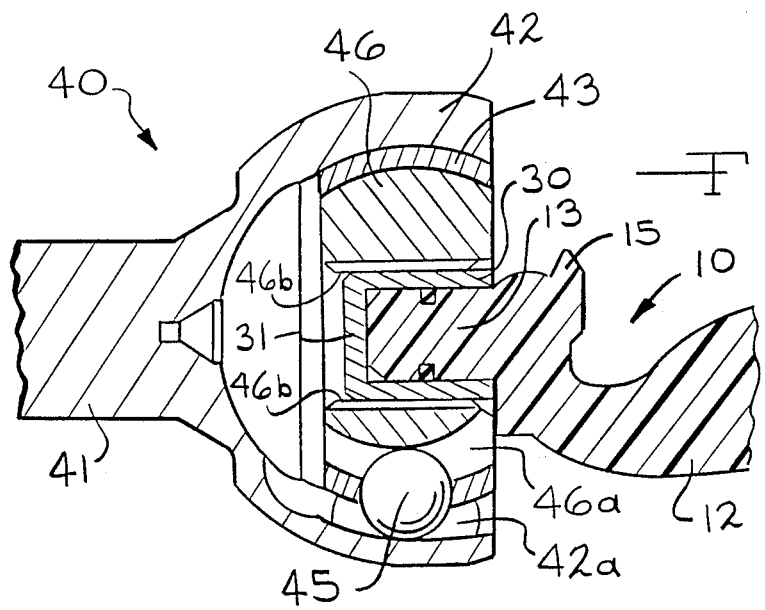
FIG. 5 is a fragmentary sectional elevational view of a constant velocity joint having the hand tool of FIG. 1 inserted therein for use, the constant velocity joint being illustrated in an initial assembled position.

Referring now to the drawings, there is illustrated in FIG. 1 an improved hand tool, indicated generally at 10, in accordance with the present invention. The hand tool 10 is adapted to assist a person in assembling and disassembling a constant velocity joint, as will be described in detail below. The hand tool 10 is preferably formed from a glass-reinforced nylon material, the ratio of glass within the composition ranging from forty percent to fifty percent. However, it will be appreciated that any relatively rigid material can be utilized to form the hand tool 10.

The hand tool 10 includes an elongated handle portion 11 connected to one end of a generally C-shaped body portion 12. The handle portion 11 may be provided with a plurality of adjacent circumferential recesses 11a to comfortably receive the fingers of a person grasping the hand tool 10. The opposite end of the C-shaped body portion 12 is connected to an elongated projection 13. The projection 13 is generally aligned with the handle portion 11 and may be co-axial therewith. As shown in FIG. 1, the projection 13 is connected to the upper portion of an outer edge 12a (i.e., the edge facing away from the handle portion 11) of the other end of the C-shaped body portion 12. The lower portion of the outer edge 12a of the C-shaped body portion 12 is generally flat so as to form a shoulder. The outermost end of the projection 13 can be formed with a tapered surface 13a, for a reason which will be explained below. An upstanding hook portion 15 is also connected to the other end of the C-shaped body portion, but on an inner edge 12b thereof. The projection 13 has a circumferential groove (not shown) formed therein which is adapted to receive an elastomeric O-ring 16. As shown in FIG. 1, the handle portion 11, the C-shaped body portion 12, the projection 13, and the hook portion 15 may all be formed integrally with one another.

Referring now to FIG. 2, there is illustrated a portion of an alternate embodiment of a hand tool 20 in accordance with the present invention. The hand tool 20 includes a handle portion (not shown), similar to the above-discussed handle portion 11, connected to one end of a C-shaped body portion 21. The opposite end of the C-shaped body portion 21 is connected to an elongated projection 22. The projection 22 is generally aligned with the handle portion (not shown) of the hand tool 20 and may be co-axial therewith. As shown in FIG. 2, the projection 22 is connected to the upper portion of an outer edge 21a of the other end of the C-shaped body portion 21. The lower portion of the outer edge 21a of the C-shaped body portion 21 is generally flat so as to form a shoulder. The end of the projection 22 can be formed with a tapered surface 22a, for a reason which will be explained below. The projection 22 has a circumferential groove 22b formed therein which is adapted to receive an elastomeric O-ring 23.

An inner edge 21b of the C-shaped body portion 21 has a recess 21c formed therein. An elongated hook pin 25 is sized to fit telescopically within the recess 21c and be slidably movable therethrough. The hook pin 25 includes a plurality of apertures 25a formed therethrough, which apertures 25a extend generally transversely with respect to the longitudinal axis of the hook pin 25. A single aperture 21d is formed through the C-shaped body portion 21 in a direction which is parallel to the longitudinal axes of the apertures 25a. A locking pin 26 is provided which is adapted to be inserted through the C-shaped body portion aperture 21d and a selected one of the hook pin apertures 25a so as to maintain the hook pin 25 in a desired extended position relative to the hand tool 20. The locking pin 26 can be removed and re-inserted through the C-shaped body portion aperture 21d and a different one of the hook pin apertures 25a to vary the length of the hook pin 25 which extends outwardly from the inner side 21b of the hand tool 20.

Referring now to FIGS. 3 and 4, there is illustrated two different end portions 30 and 30' adapted for use with either of the hand tools 10 or 20 described above. The end portions 30 and 30' are each formed generally in the shape of a hollow cylinder having one closed end 31 and 31', respectively. The closed ends 31 and 31' can include a tapered edge 32 and 32', respectively, for a reason which will be explained below. The inside diameters of the end pieces 30 and 30' are equal and are slightly larger than the outside diameter of either of the projections 13 or 22. However, the outsie diameters of the end pieces 30 and 30' themselves are different, the outside diameter of the end piece 30 being somewhat smaller than the outside diameter of the end piece 30'. The end pieces 30 and 30' are representative of a plurality of similar end pieces (not shown) which can be utilized in conjunction with either of the hand tools 10 or 20. All of such end pieces are formed with the same inside diameter as the end pieces 30 and 30', but with different outside diameters.

Each of the end pieces 30 and 30' is adapted to be disposed and selectively retained about the projection 13 or 22 of one of the hand tools 10 or 20, respectively. For example, to insert the end piece 30 about the projection 13 of the hand tool 10, the end piece 30 is first longitudinally aligned with the projection 13 such that opened end of the end piece 30 is disposed adjacent the tapered surface 13a. The end piece 30 is then axially moved toward the hand tool 10 such that the projection 13 is inserted through the opened end thereof. The tapered surface 13a is provided on the projection 13 to facilitate the alignment and insertion of the end piece 30 about the projection 13. As the end piece 30 is inserted about the projection 13, the O-ring 16 is slightly compressed within the groove (not shown) because the outer diameter of the O-ring 16 is slightly larger than the inner diameter of the end piece 30. Thus, the end piece 30 is frictionally retained about the projection 13. The size of the O-ring 16 is selected such that a predetermined amount of force is required to insert and remove the end piece 30 from the projection. This predetermined amount of force can be any value which prevents the end piece 30 from slipping off accidentally, but which permits the end piece 30 to be removed by hand with a moderate amount of force.

Figure 6:
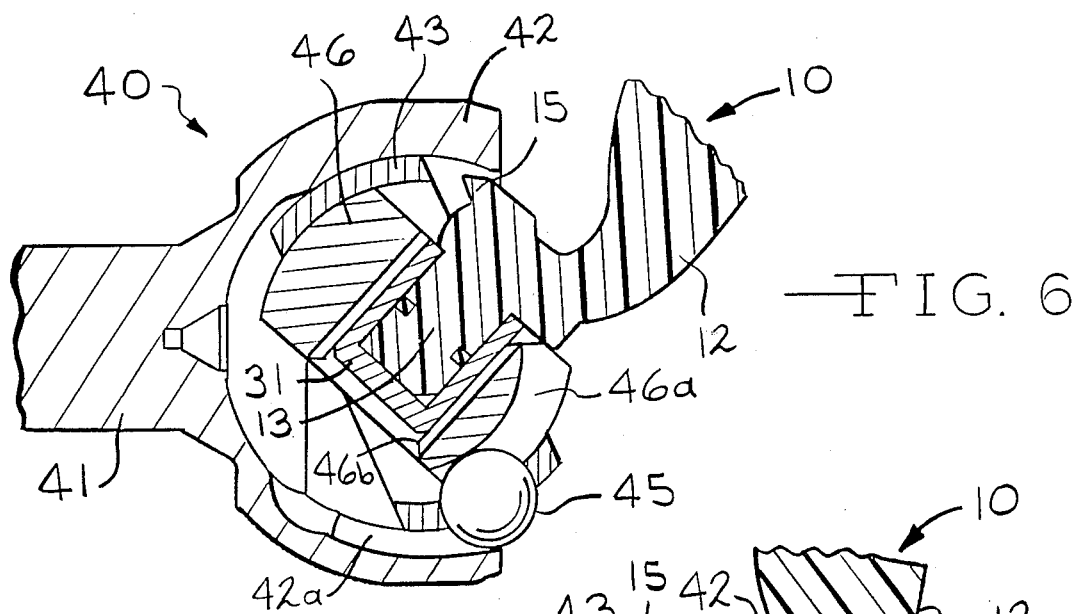
FIG. 6 is a fragmentary sectional elevational view similar to FIG. 5 illustrating the hand tool having moved the constant velocity joint to an intermediate position.
Figure 7:
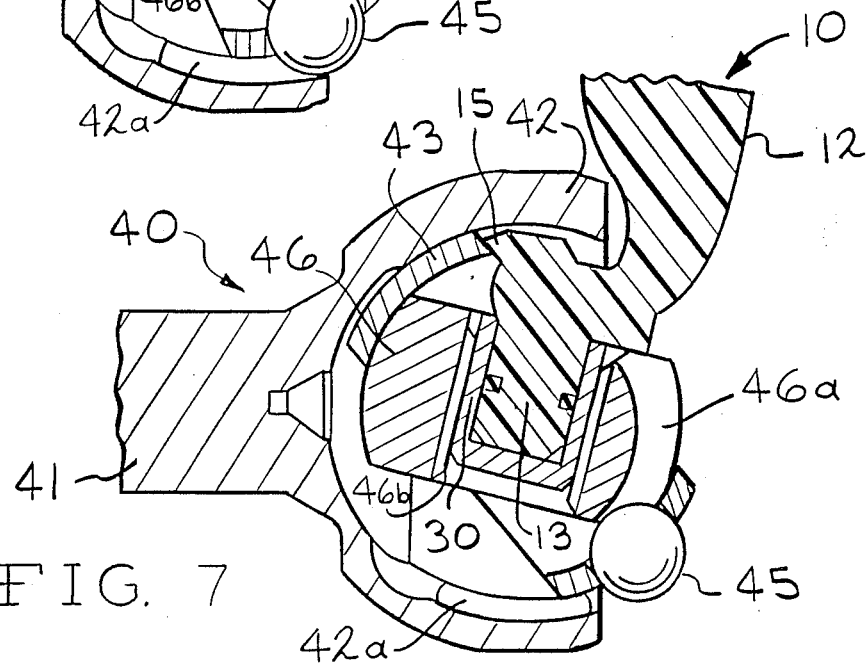
FIG. 7 is a fragmentary sectional elevational view similar to FIG. 5 illustrating the hand tool having moved the constant velocity joint to a disassembly position.

Referring now to FIGS. 5, 6, and 7, the use of the hand tool 10 is illustrated in connection with a bell-type constant velocity joint, indicated generally at 40. The constant velocity joint 40 includes a yoke or shaft 41 which is formed integrally with an outer race 42. Within the outer race 42, a ball cage 43 is disposed. The ball cage 43 is adapted to retain a plurality of ball bearings 45 (only one is illustrated) within the joint 40. An inner race 46 is disposed within the ball cage 43 and the ball bearings 45. The outer race 42 and the inner race 46 are formed with respective grooves or raceways 42a and 46a (only one of each is illustrated), respectively, which engage the ball bearings 45 and provide a driving connection therebetween. Additionally, the inner 46 is provided with a plurality of splines 46b which are adapted to receive a corresponding splined end (not shown) of a second shaft (not shown). The structure and operation of the constant velocity joint 40 is conventional in the art and forms no part of the present invention.

The splines 46b formed on the inner race 46 define an aperture having an inner diameter therebetween which corresponds to the outer diameter of a selected one of the plurality of end pieces, for example, the end piece 30. Thus, in order to disassemble the constant velocity joint 40, the end piece 30 is initially inserted about the projection 13 of the hand tool 10, as described above. The hand tool 10 is then manipulated such that the end piece 30 retained thereon is inserted within the inner race 46, as shown in FIG. 5. The tapered edge 32 of the end piece 30 facilitates alignment and insertion of the end piece 30 within the aperture of the inner race 46. Once inserted, the hand tool 10, and consequently the inner race 46, can be rotated relative to the outer race 42. As shown in FIG. 6, rotation of the inner race 46 causes corresponding rotation of the ball cage 43, but to a lesser extent. Typically, the construction of the joint 40 is such that the ball cage 43 is rotated at approximately half the angle that the inner race 46 is rotated relative to the outer race 42. As shown in FIG. 7, the concave side of the C-shaped body portion 12 receives the outer edge of the outer race 42 after a certain amount of rotation of the hand tool 10. Thus, the C-shaped body portion 12 permits the tool 10 and the inner race 46 to be rotated further than would normally be possible if a splined shaft (not shown) was inserted within the inner race 46 extending linearly therefrom. At some point in the rotation of the inner race 46, depending upon the size of the joint 40 and the size of the hook portion 15, the hook portion 15 of the hand tool 10 will abut the side of the ball cage 43, as shown in FIG. 7. From this point on, the inner race 46 and the ball cage 43 rotate together by the same angular amount. The hook portion 15 is provided to ensure that the ball cage 43 is rotated sufficiently to permit the ball bearings 45 to be removed from the ball cage 43. Once all of the ball bearings 45 have been removed, the inner race 46 and the ball cage 43 can be removed from the outer race 42 for inspection and, if necessary, replacement. By reversing the above-described process, the constant velocity joint 40 can be re-assembled.

As mentioned above, the differently sized outer diameters of the end pieces 30 and 30' are adapted for use in differently sized constant velocity joints 40. The movable hook pin 25 illustrated in the hand tool 20 of FIG. 2 can also be utilized to vary the extended length thereof for differently sized constant velocity joints 40. Thus, in relatively small constant velocity joints, the hook pin 25 will be maintained in the retracted position illustrated in FIG. 2. In relatively larger constant velocity joints, the hook pin 25 will be maintained at other extended positions so as to increase the overall length thereof to engage and rotate the ball cage to the disassembly position illustrated in FIG. 7.

In accordance with the provisions of the patent statutes, the principle and mode of operation of the present invention have been explained and illustrated in its preferred embodiments. However, it must be understood that the present invention can be practiced otherwise than as specifically explained and illustrated without departing from its spirit or scope.

What is claimed is:

1. A hand tool adapted for use in assembling and disassembling a plurality of constant velocity joints of varying size, each constant velocity joint including an outer race, a plurality of ball bearings maintained within the outer race by a ball age, and an inner race disposed within the ball bearings and the ball cage, the inner race including an aperture formed therein which varies in size with the size of the particular constant velocity joint, comprising:
    a handle portion;
    a generally C-shaped body portion having one end connected to said handle portion;
    a generally cylindrical projection connected to the other end of said C-shaped body portion, said projection having a predetermined outer diameter;
    a hook portion connected to said other end of said C-shaped body portion, said hood portion including a recess formed in said C-shaped-body portion and a hook pin slidably disposed within said recess;
    a plurality of differently sized end pieces, each of said end pieces being formed in the shape of a hollow cylinder and each having an inner diameter which is slightly larger than the outer diameter of said projection and an outer diameter which is different from the others of said end pieces, each of said outer diameters of said end pieces corresponding in size with the aperture of one of the plurality if differently sized constant velocity joints so as to be insertable therein for use; and
    means for selectively retaining one of said plurality of end pieces on said projection for use.

2. The invention defined in claim 1 wherein said hook portion is formed integrally with said C-shaped body portion.

3. The invention defined in claim 1 further including means for maintaining said hook pin within said recess at a desired extended position relative to said hand tool.

4. The invention defined in claim 3 wherein said maintaining means includes a locking pin adapted to be inserted through an aperture formed in said C-shaped body portion and through a selected one of a plurality of apertures formed in said hook pin to maintain said hook pin at said desired extended position.

5. The invention defined in claim 1 wherein said means for selectively retaining includes a circumferential groove formed about said projection and an elastomeric O-ring disposed within said groove, said O-ring having an outer diameter which is slightly larger than the inner diameter of each of said end pieces so as to frictionally retain a selected one of said end pieces about said projection.

6. A hand tool adapted for use in assembling and disassembling a plurality of constant velocity joints of varying size, each constant velocity joint including an outer race, a plurality of ball bearings maintained within the outer race by a ball cage, and an inner race disposed within the ball bearings and the ball cage, the inner race including an aperture formed therein which varies in size with the size of the particular constant velocity joint, the hand tool comprising:
    a handle portion;
    a generally C-shaped body portion having one end connected to said handle portion;
    a projection connected to the other end of said C-shaped body portion;
    a plurality of differently sized end pieces, each of said end pieces having an outer size which is different from the others of said end pieces, each of said outer sizes of said end pieces corresponding in size with the aperture of one of the plurality of differently sized constant velocity joints so as to be insertable therein for assembling and disassembling the joints; and
    means for selectively retaining a selected one of said plurality of said end pieces on said projection for assembling and disassembling a corresponding one of said differently sized constant velocity joints.

7. The invention defined in claim 6 wherein said projection is generally cylindrical in shape and defines an outer diameter, and wherein each of said differently sized end pieces is formed generally in the shape of a hollow cylinder having an inner diameter which is slightly larger than said outer diameter of said projection.

* * * * *